(No Model.)

J. N. SKINNER.
LATHE CHUCK.

No. 255,039. Patented Mar. 14, 1882.

Witnesses.
Edwin F. Dimock.
Chas. L. Burdett.

Inventor.
James N. Skinner
by Theo. G. Ellis, Attorney

UNITED STATES PATENT OFFICE.

JAMES N. SKINNER, OF NEW BRITAIN, CONNECTICUT.

LATHE-CHUCK.

SPECIFICATION forming part of Letters Patent No. 255,039, dated March 14, 1882.

Application filed November 25, 1881. (No model.)

*To all whom it may concern:*

Be it known that I, JAMES N. SKINNER, of New Britain, in the county of Hartford and State of Connecticut, have invented certain new and useful Improvements in Lathe-Chucks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to lathe-chucks which are adapted to be used either as universal or independent jaw-chucks, and particularly to the form of chuck for which I have been granted Letters Patent of the United States, dated June 24, 1879, and numbered 216,766.

The object of my present invention is to provide a better method of shifting the ring which raises the rack for uniting the pinions on the jaw-screws, and for holding it in place when the rack is engaged with the jaws for making the chuck universal.

Figure 1:
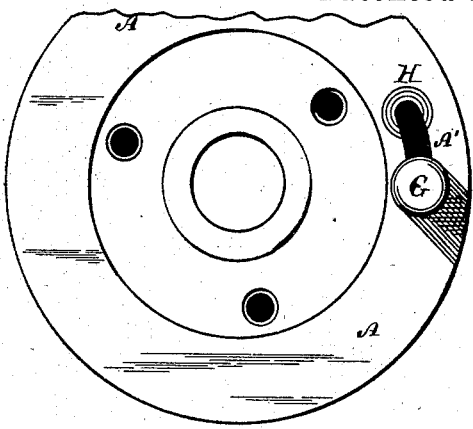
Figure 2:
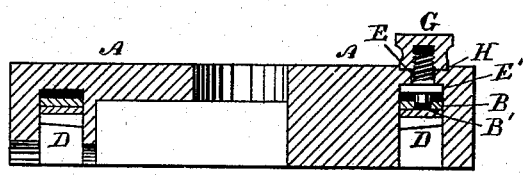
Figure 3:
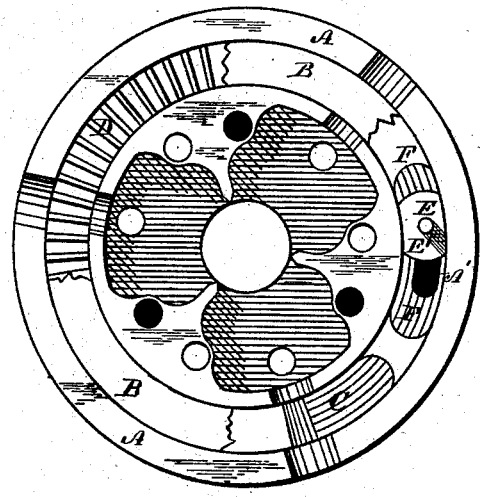
Figure 4:

In the accompanying drawings, illustrating my invention, Figure 1 is a back view of a lathe-chuck having my improvement. Fig. 2 is a cross-section through the back plate of a chuck, showing the parts embraced by my present invention. The front plate with the jaws is not shown. Fig. 3 is an interior view of the back plate and its contained parts, some of them being partially cut away to show my improvement. Fig. 4 is a detached view of the handle and clamping device.

A is the back plate of the chuck, removed from the front plate, which carries the jaws, with their screws and pinions, in the usual manner.

B is the cam-ring, the shifting of which through a small part of the circle throws the rack D in or out of gear with the pinions of the screws.

C are the sockets in which the cam-projections on the ring B lie when the parts are in the position shown in Figs. 1 and 3, or when the circular rack D is not in gear with the pinions. When the ring B is turned into the position shown in Fig. 2 in section the projections slide out of the sockets and raise the ring, so as to push the rack into gear.

E is a pin passing through a slot, A', in the plate A, and entering into a hole, B', in the ring B. This pin slides back and forth in the slot A' to move the ring, and moves also up and down in the hole B' as the ring is pressed out or in by the cams. The pin E is furnished with a plate, E', which slides in a shallow socket, F, in the inner surface of A, so as to let the plate E' into the back plate, A, flush with the under side of the ring B. The outer end of the pin E is furnished with a screw-thread, upon which screws the head G, which, with the plate E', serves as a clamp to hold the pin firmly in place, as well as to provide a handle by which it is moved.

On the outside of the back plate, A, at the end of the slot A', in which the pin E rests when the rack D is engaged with the pinions of the jaw-screws, is the circular recess H. This forms a socket into which the lower end of the head G enters when it is screwed down in this position, and locks the pin from moving back along the slot A' while the rack is engaged with the pinions. When the head G is thus screwed down into the socket or recess H it clamps the plate E against the inside of the back A and holds the pin rigidly in place, so that no jar or movement produced by the operation of setting the jaws of the chuck can by any possibility disturb the position of the ring B and allow the circular rack D to be released.

The operation of my invention is as follows: When the parts are in the position shown in Figs. 1 and 3 the ring B rests in the bottom of the channel shown in the plate A, and the rack is disengaged. When it is desired to use the chuck as a universal chuck the head G is moved along the slot A' and screwed down into the recess H. This moves the ring B so that its cams push the rack D forward and engage the pinions of the jaws, and holds the parts in position until it is wished to again release them. By means of my present invention the parts are easily and readily moved, and at the same time held firmly when desired.

What I claim as my invention is—

1. In combination with the plate A and cam-ring B of a lathe-chuck, the clamping device consisting of the pin E, with its plate E', and the head G, said pin being separate from the said ring, and constructed and operating substantially as described.

2. In a lathe-chuck, the plate A, provided with the slot A' and locking recess H, for holding the head D in position when clamped, in combination with the pin E, head G, and cam-ring B, substantially as described.

3. In a lathe-chuck, an independent pin moving in a groove or slot in the plate A, and adapted to be clamped to said plate, and fitting loosely into a hole in the ring B, whereby said ring may be moved radially and clamped in position without being attached to said pin, substantially as described.

JAMES N. SKINNER.

Witnesses:
 THEO. G. ELLIS,
 WILMOT HORTON.